United States Patent [19]
Joseph

[11] Patent Number: 5,474,226
[45] Date of Patent: Dec. 12, 1995

[54] PROJECTILE WELDING

[75] Inventor: Adrian A. Joseph, Los Angeles, Calif.

[73] Assignee: Orbit Technologies, Inc., Carlsbad, Calif.

[21] Appl. No.: 255,274

[22] Filed: Jun. 8, 1994

[51] Int. Cl.⁶ ................................................ B23K 20/06
[52] U.S. Cl. ........................ 228/112.1; 228/115; 228/139
[58] Field of Search ............................... 228/139, 112.1, 228/107, 115

[56] References Cited

U.S. PATENT DOCUMENTS

| | | | |
|---|---|---|---|
| 2,563,107 | 8/1951 | Fanger | 228/139 X |
| 2,957,237 | 10/1960 | Régié et al. | 228/139 X |
| 3,544,761 | 12/1970 | Rosenberg | 219/137 R |
| 3,609,286 | 9/1971 | Bresson et al. | 219/78.14 |
| 3,958,743 | 5/1976 | Ishii et al. | 228/226 |
| 3,988,146 | 10/1976 | Kondis | 75/5 A |
| 4,019,018 | 4/1977 | Oishi et al. | 219/137 R |
| 4,037,078 | 7/1977 | Oishi et al. | 219/137 R |
| 4,368,371 | 1/1983 | Dilthey et al. | 219/73 |
| 4,591,687 | 5/1986 | Urech et al. | 219/93 |
| 4,674,672 | 6/1987 | Anderson | 228/135 |
| 4,760,240 | 7/1988 | Iikawa et al. | 219/121.64 |
| 5,015,816 | 5/1991 | Bush et al. | 219/119 |
| 5,024,371 | 6/1991 | Unde | 228/216 |
| 5,082,160 | 1/1992 | Leigh | 228/110.1 |
| 5,104,456 | 4/1992 | Dvormak et al. | 29/527.5 |
| 5,126,528 | 6/1992 | Bush et al. | 219/119 |
| 5,171,378 | 12/1992 | Kovarik et al. | 148/24 |
| 5,244,645 | 7/1993 | Cooper et al. | 228/157 |

Primary Examiner—Kenneth J. Ramsey
Attorney, Agent, or Firm—Ladas & Parry

[57] ABSTRACT

Disclosed in this description is a means for welding materials together by shooting a projectile partially therethrough.

12 Claims, 2 Drawing Sheets

PROJECTILE WELDING

FIELD OF THE INVENTION

The present invention relates to a mechanism and a method for joining metals together.

BACKGROUND OF THE INVENTION

There is much disclosed and written about the joining of materials together and particularly metals through various welding techniques. Some techniques make use of chemical means, others look to the use of heat and still others involve ultrasonic devices. Some examples of such devices and methodology are found in U.S. Pat. Nos., 4,037,078; 4,368,371; 4,591,687; and 5,082,160. The present invention and method is quite different. Joinder is accomplished by shooting a projectile partially through the metals to be joined.

Looking to the joining or welding of aluminum or its alloys, there is the issue of the formation of "hot tears". The "hot tear" effect manifests itself in the form of a crack generated behind the solid front of a weld.

To understand this situation, one must look to the make-up of the metal. The crystallograins of weld metal will assume the orientation of the parent seed crystal adjacent to the fusion zone even though competitive growth between grains will exist owing to the relationship between preferred growth directions and the thermal gradients in the weld pool. The nucleation of new grains with more favorable orientations is seldom observed in the absence of heterogenous nuclei.

Prior art improvements have been achieved in the weldability of metals and in particular aluminum and its alloys. This has been accomplished largely by refinement of the weld metal grain size by adding an element which will provide some type of substrate upon which new grains of weld metal can form. Unfortunately, the prior art is anything but conclusive as to the relationship between usable intermetallic inclusions in the welding consumable, such as the welding wire, and the process of manufacturing the consumable. Similarly, the prior art is silent on the sensitivity of the intermetallic inclusions in the consumable to the thermodynamics of the weld itself.

It is believed that the present invention addresses these issues by presenting a process which may be used with or without electrical power. More precisely, the present invention operates without the application of heat to the projectile or the material to be welded.

SUMMARY OF THE INVENTION

Disclosed herein is a method for welding or joining materials together by shooting a projectile partially therethrough. It is further disclosed that the projectile is made of the same material as the material to be joined. Also disclosed is a device for projecting said projectile at a high impact velocity into and at least partially through the material to be joined. Further disclosed is a stopping mechanism on said device for impacting against the projectile.

It is believed that this method of joinder achieves a multi molecular nucleation between the materials to be joined. The projectile will penetrate at high speed the layers of material and crush against the stopping mechanism. The high speed of penetration of the projectile through the material will cause a local micronic melting of the material around the projectile and of the projectile itself since the two are of the same material.

Due to the fact that the thermo-velocity relation is only at a micro level, cracks do not seem to occur and a strong reliable substructure bonding takes place. The method and device are particularly effective for aluminum and its alloys. Its practice and usage are fast and economical as compared to conventional welding techniques.

DRAWINGS

DETAILED DESCRIPTION

Figure 1:
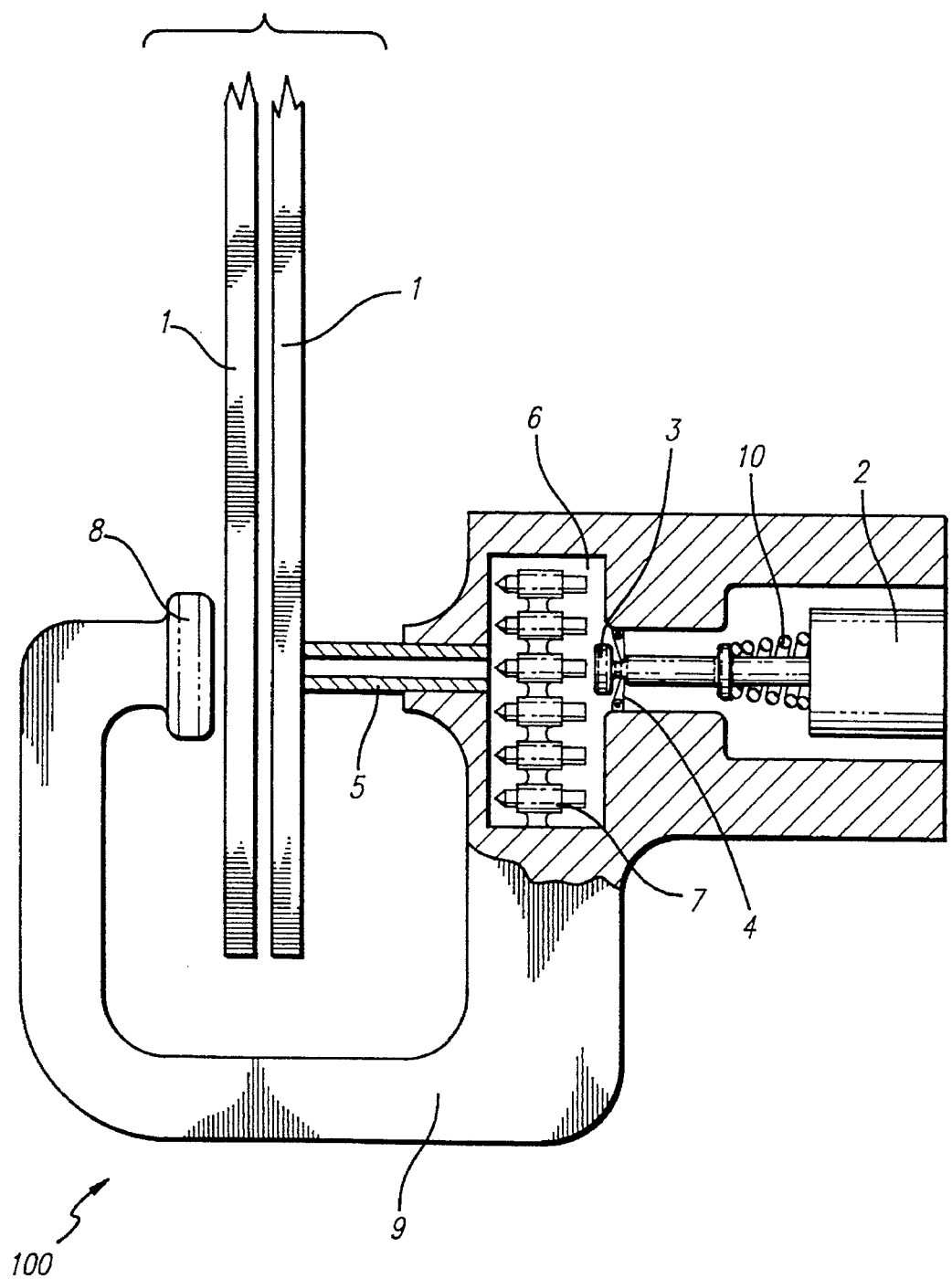
FIG. 1 is diagrammatic view of one embodiment of a device of this invention.
Figure 2:
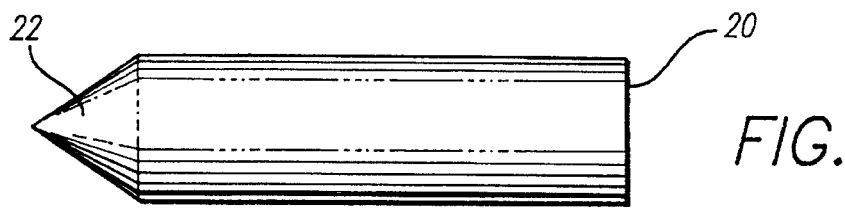
FIGS. 2 through 5 are diagrammatic views of projectiles of this invention.
Figure 3:
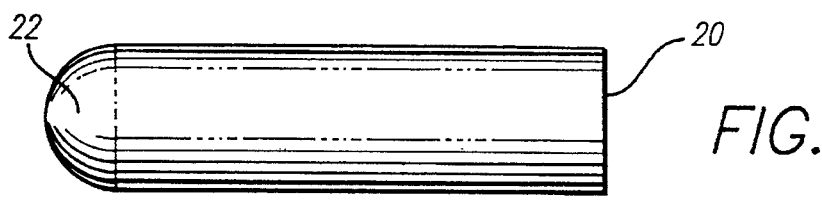
Figure 4:
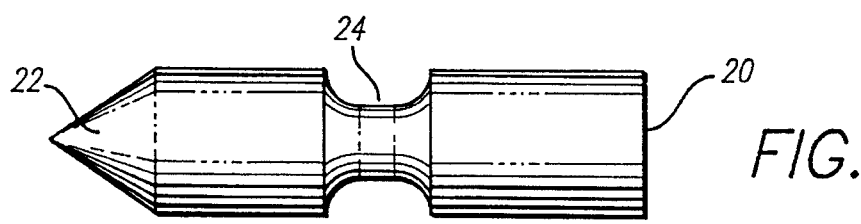
Figure 5:
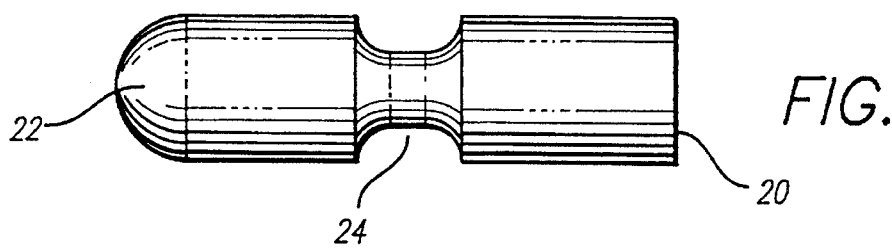

In FIG. 1 two pieces of material to be joined such as aluminum or aluminum alloy (1) are held in a vice-like device which is the joining mechanism (100) herein. On one side of joining mechanism (100) is an impacter (2) and at the opposing side of joining mechanism (100) at the same level as impacter (2) is stopping mechanism (8). Extending parallel to impacter (2) and the pieces (1) being held by joining mechanism (100) is a projectile container (7) which joins u-shaped arm (9) that extends below pieces (1). U-shaped arm (9) connects at an end opposite its connection to projectile container (7), to stopping mechanism (8). As can be seen from FIG. 1, one side of projectile container (7) connects to impacter (2). The opposing side of projectile container (1) connects to a barrel (5) which acts in part to hold pieces (1) against stopping mechanism (8).

Impacter (2) is comprised of a hammer (3) movably situated with respect to a locking mechanism (4) and spring means (10). This is a very rough depiction of an impacter device and any impacter device is suitable. The device must merely cause a hammer (3) to move forcefully against a projectile held in projectile container (7) to propel that projectile into barrel (5) and into pieces (1). Impacters of this nature are: electro-magnetic, gas cylinder, hydraulic, mechanical such as mechanical off-center drive-shaft with a clutch, and explosive-triggering devices. The locking mechanism (4) may well act as a clutch unit to compress a mechanical lever that would lock hammer (3) after each impact.

Projectile container (7) preferably includes a loading mechanism such as a magazine so that more than one projectile can be housed therein. On the other hand, the projectiles could simply drop from a holder into the container (7) or a chain driven loader held within container (7) is possible for holding projectiles and delivering them to a position for impact by the hammer (3).

It is preferred that hammer (3) and barrel (5) be in alignment with each other and with the longitudinal axis of the projectile. It is also preferred that the barrel (5) be situated perpendicularly to the pieces (1) or at least be located in some means such that the projectile is delivered perpendicularly against pieces (1).

Some sample projectiles are seen in FIGS. 2 through 5. They are shown with cylindrical bodies (20) and tips (22) and are longer than they are wide thereby having a clear longitudinal axis along such length. In FIGS. 2 through 5, the tips (22) are symmetrically formed and generally rounded or pointed. It is intended that the tipb 54742366.001 impact first the pieces (1) to be joined. In the FIGS. 4 and 5, bodies (22) exhibit a concave groove or dent (24) therearound. As noted earlier herein, the projectiles are generally preferred to be made of the same material as the materials to be joined, or pieces (1). The configuration shown in the last two figures wherein grooves (24) are shown would likely be used when higher than usual friction is expected at impact causing excess material to melt upon contact of tip (22) of the with pieces (1).

The impact strength, size of projectile, and length of barrel (5) are all dependent upon the material pieces (1) to be joined and, of course, the projectile material. This may be readily calculated when it is understood that the projectile is to penetrate pieces (1) to be joined and the mutual at least surface molten state of projectile and pieces (1) in the area surrounding the projectile is desired.

The device of FIG. 1 has adjustment means not shown for moving stopping mechanism (8) toward and away from barrel (5) to adjust to the width of pieces (1) to be held. It is also possible that barrel (5) could be adjustable in length or detachable to place different lengths of barrels (5) therein. Additionally, the inventor contemplates the use of a plurality of barrels (5) and impactors in one mechanism or even a mechanism to rotate pieces (1) between barrel (5) and stopping mechanism (8) so that a plurality of points of joinder are available.

U-shaped arm (9) is somewhat flexible to absorb the shock of the impact of the projectile against the face of stopping mechanism (8). Preferably, the face of stopping mechanism (8) which is impacted by tip (22) is of tool steel and preferably but not necessarily, the face of stopping mechanism (8) is flat. Using aluminum or aluminum alloy as pieces (1) and projectiles of like material, the surface hardening of the face of tool steel of 58–62 Rc was sufficient. It is understood that the face of the stopping mechanism (8) must be constructed to arrest the motion of the projectile as it begins to penetrate completely through pieces (1).

In the use of aluminum or aluminum alloy as pieces (1) and the projectiles, hammer (3) used was made from stainless steel 316 or Tool Steel. Needless to say, the portion of the hammer (3) which abuts the end of the projectile to project it into barrel (5) is of a size that is proportional to the size of the projectile to facilitate obtaining the desired speed of the projectile as it enters the barrel (5). In these tests, the barrel (5) was made of stainless steel 316 or high tempered steel.

Figure 6:
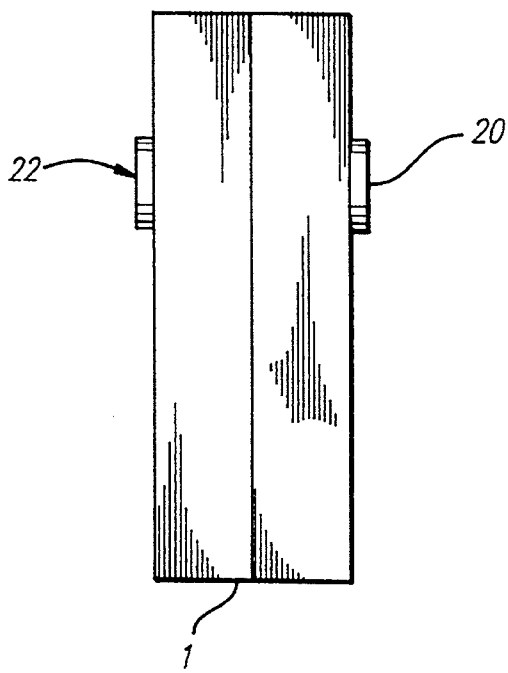
FIG. 6 is a diagrammatic view of two pieces joined by a projectile.

FIG. 6 shows pieces (1) joined by a projectile. The flattened tip (22) and opposing body (20) end results from the impact of the projectile with pieces (1) and in the case of tip (22) its abutment against stopping mechanism (8) will not exhibit perceivable crating or cracking in the substructure of the joint point.

To propel the projectile, an impacter is used. The impacter may be of any known construction such as explosive, mechanical, hydraulic, gas-driven, or electro-magnetic.

The projectile is to be released in place for impact by the impacter such that interlayer stresses in the projectile are minimized. The projectile is preferably of the same material as the materials to be joined or welded.

To obviate manual loading, a loading mechanism is suggested for use with the impacter. Such mechanism may include a magazine such as used in firearms. Passage of the projectile through the pieces to be joined is stopped by a stopping mechanism which may be a single or multiple unit. It is only necessary that the tip of the projectile and its opposite end are ultimately flattened after impact and joining the pieces to be joined. These flattened ends create additional joining forces to hold the pieces that are joined together.

The present invention is claimed as follows.

I claim:

1. A method for welding material together comprised of shooting a projectile partially through the material at a velocity such that said projectile and said material form a weld.

2. The method of claim 1 wherein said projectile is of the same material as said material.

3. The method of claim 1 wherein said projectile is shot perpendicular to said material.

4. A device for welding material by shooting a projectile partially through said material, said device being comprised of:

impact means;

stopping means, wherein said projectile is impacted by said impact means and thereby shot partially through said material to abut against said stopping means.

5. The device of claim 4 wherein said stopping means is mobile enough to absorb the impact of said projectile.

6. The device of claim 5 further comprising holding means for holding the material to be welded against said stopping means.

7. The device of claim 4 wherein said stopping means has a surface shape which causes said projectile to flatten thereagainst thus forming a flattened end on one side of said welding material, said impacter having a shape causing the opposing side of said projectile to form a flattened end on a side opposing said one side of said welding material, such that the weld formed by said projectile and said material is flattened at opposing ends and against said material.

8. The device of claim 4 wherein there is a plurality of impact means, stopping means, and projectiles such that a plurality of welds may be formed at one time.

9. A device for welding material by shooting a projectile partially through said material, said device being comprised of:

impact means; and stopping means, wherein said projectile is impacted by said impact means and thereby shot partially through said material to abut against said stopping means, and wherein said projectile has a rounded or pointed tip extending from (atop) a generally cylindrical body, said tip being located opposite said impact means such that when said projectile is shot by said impact means said tip will abut against said stopping means.

10. The projectile of claim 9 wherein said body has an indentation around its diameter.

CONCLUSION

Some of the salient points set forth above are as follows.

Disclosed is a method and device for joining or welding materials such as aluminum or aluminum alloy. The method involves shooting a projectile of the same material as that material to be joined at the material to be joined and shooting it preferably perpendicular to that material. The speed at which the projectile is shot taking into account its own mass will cause the projectile to impact and penetrate the pieces of material to be joined. In doing so, the friction between the projectile and the material to be joined will result in micro melting of the material surrounding the projectile as well as the projectile and thereby the welding of the two base materials. The weld created in this fashion 11. An article of manufacture having weld formed between metals, said weld being comprised of a projectile that is flattened at both ends against said metals to assist in holding said metals together.

12. The article of claim 11 wherein said metals and said projectile are comprised of the same material.

* * * * *